United States Patent [19]
Yoshida

[11] 3,887,844
[45] June 3, 1975

[54] OVERCURRENT PROTECTION CIRCUIT FOR A BRUSHLESS DIRECT CURRENT MOTOR

[75] Inventor: Masayuki Yoshida, Tokyo, Japan

[73] Assignee: Pioneer Electronic Corporation, Tokyo, Japan

[22] Filed: Dec. 12, 1973

[21] Appl. No.: 424,026

[30] Foreign Application Priority Data
Dec. 12, 1972 Japan.............................. 47-142587

[52] U.S. Cl. ........ 317/13 R; 317/33 R; 317/36 TD; 318/254
[51] Int. Cl. .......................................... H02h 7/085
[58] Field of Search......... 318/254; 317/13 R, 33 R, 317/36 TD, 154

[56] References Cited
UNITED STATES PATENTS
3,757,185   9/1973   Brunner et al..................... 318/254

*Primary Examiner*—James D. Trammell
*Attorney, Agent, or Firm*—Sughrue, Rothwell, Mion, Zinn and Macpeak

[57] ABSTRACT

Hall elements are used to control the energization of the driving coils of a brushless D.C. motor. An overcurrent in any one of the coils is detected by a resistor which produces a voltage which is delayed and then applied to a switching circuit which interrupts the control current of the Hall elements, thereby interrupting the driving coil current and stopping the motor.

3 Claims, 1 Drawing Figure

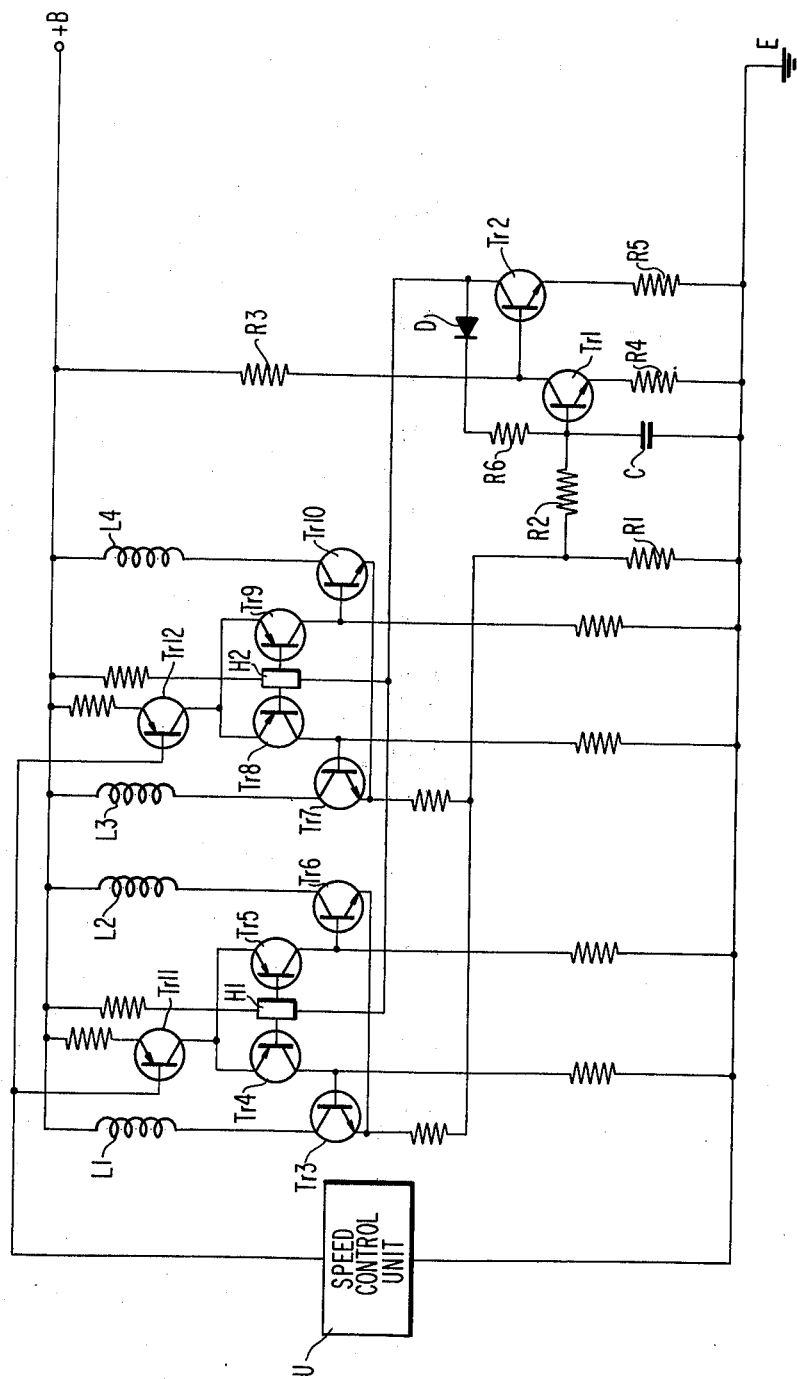

OVERCURRENT PROTECTION CIRCUIT FOR A BRUSHLESS DIRECT CURRENT MOTOR

BACKGROUND OF THE INVENTION

1. Field of the Invention

This invention relates to an overcurrent protection circuit for a direct current motor, and, more particularly, such an overcurrent protection circuit which protects the motor from abnormal conditions by detecting such abnormal conditions with a transistorized circuit and electronically interrupting the driving circuit of the motor when the motor continuously draws abnormal overcurrent during a predetermined short time period.

2. Description of the Prior Art

In the prior art, a fuse inserted in a supply line of a driving current has been usually used for protecting a direct current motor from an abnormal overcurrent. However, such a fuse is unreliable because it is difficult to accurately maintain a detection level of the abnormal overcurrent due to differences in properties among fuses themselves, and because the fuse gradually deteriorates from repeatedly carrying large currents. Also, the replacement of a broken fuse is troublesome and uneconomical. The structure of a brushless DC motor of the type to which this invention pertains is described in U.S. Pat. No. 3,631,272, issued on Dec. 28, 1971.

SUMMARY OF THE INVENTION

The present invention diminishes the above-mentioned defects.

The primary object of the present invention is to provide an overcurrent protection circuit suitable for a brushless direct current motor, more particularly for a Hall element motor.

Another object of the present invention is to provide an overcurrent protection circuit which is simple in its circuit construction.

BRIEF DESCRIPTION OF THE DRAWING

The FIGURE is a circuit diagram showing one embodiment of an overcurrent protection circuit for a brushless direct current motor made in accordance with the present invention.

DESCRIPTION OF THE PREFERRED EMBODIMENT

Referring to the FIGURE, resistor R1 detects the motor energizing currents which flow in the motor driving coils L1, L2, L3 and L4, and converts the detected current to a proportional voltage. Resistor R2 and capacitor C form a time constant or delay circuit. Transistor Tr1 is normally nonconducting or OFF. Transistor Tr2 turns ON when transistor Tr1 turns OFF and turns OFF when Tr1 turns ON. Diode D together with a resistor R6 forms a positive feedback circuit between the collector of transistor Tr2 and the base of transistor Tr1.

When the motor rotates normally, the transistor Tr1 is OFF because a relatively low voltage is developed across resistor R1, and therefore the transistor Tr2 is ON. Consequently, Hall elements H1 and H2, which are magneto-electric converting elements used for detecting the positions of the magnetic poles of the motor rotor, are supplied with normal control currents so as to drive the motor.

However, when an abnormal overcurrent continuously flows into at least one of the driving coils L1 to L4 for longer than a predetermined time period, the voltage across resistor R1 becomes much higher than that for the above normal condition; therefore, the base voltage of transistor Tr1 gradually increases through the delay circuit composed of resistor R2 and capacitor C, and, finally, transistor Tr1 turns ON. Consequently, transistor Tr2 turns OFF due to the resultant decrease of its base voltage. Since the transistor Tr2 is connected in series with the electric path supplying the control currents to the Hall elements H1 and H2, the control currents are interrupted and the Hall elements H1 and H2 become inoperative, i.e., turn OFF. When the Hall elements H1 and H2 turn OFF, driver transistors Tr4, Tr5, Tr8 and Tr9, controlled by the Hall voltages generated between the corresponding horizontal voltage or output terminals of the Hall elements H1 and H2, turn OFF simultaneously, and thus the corresponding coil-driving transistors Tr3, Tr6, Tr7 and Tr10 also turn OFF. Corresponding pairs of driver and coil-driving transistors form respective two-stage driving circuits for the four coils L1-L4. When these driving circuits turn OFF, the energizing currents to the driving coils L1-L4 are interrupted. Since the collector voltage of the transistor Tr2 is fed back positively through the resistor R6 and the diode D to the base of the transistor Tr1, the protecting operation of the protection circuit is continued, even though the voltage across resistor R1 becomes zero. In other words, transistors Tr1 and Tr2 form a latching circuit whereby transistor Tr2 is kept OFF until the circuit is reset.

The protection circuit is reset or released by short-circuiting capacitor C or by momentarily interrupting the power supply circuit. In addition, even though a large surge of motor-starting current may momentarily develop across resistor R1 a voltage which would be sufficiently high to actuate the protection circuit, the transistor Tr1 does not turn ON because of the delay in increase of its base voltage imposed by the delay circuit consisting of the resistor R2 and the capacitor C; thus, the transistor Tr2 remains ON. Consequently, the control currents for the Hall elements H1 and H2 continue to flow without interruption, and the motor starts to rotate normally.

A speed control unit U controls the speed of the motor.

As described above, a protection circuit of this invention detects an abnormal overcurrent of the motor by a resistor which develops a corresponding voltage, delays the voltage through a delay circuit composed of a resistor and a capacitor, and then operates a transistorized switching circuit to interrupt the control current of Hall element means which detect the positions of the magnetic poles of the motor rotor. Since both the detection of the magnetic pole positions and the interruption of the motor energizing circuit in the abnormal overcurrent condition are performed by the Hall elements, the protection circuit is simple and efficient. Further, since the protection circuit does not directly control or interrupt a large motor-energizing current to stop the motor, but rather controls the relatively small control current of the Hall elements, the protection circuit is reliable and inexpensive.

While the above invention has been described with respect to the preferred embodiment thereof, it will be understood by those skilled in the art that various

I claim:

1. An overcurrent protection circuit for a brushless direct current motor including a rotor having at least one pair of magnetic poles and a stator including at least a pair of driving coils for rotating the rotor, said protection circuit comprising:
   a. driving circuit means for alternately supplying current to said driving coils;
   b. magneto-electric converting means for controlling said driving circuit by means of its output voltage, said output voltage varying in accordance with the variation of the magnetic field generated by said magnetic poles of said rotor;
   c. a resistor connected in series with said driving coils and developing a voltage proportional to the current flowing through said coils;
   d. delay circuit means for delaying the voltage developed by said resistor; and
   e. switching circuit means, switched and latched when the output of said delay circuit increases to a predetermined level, for directly interrupting the operating control current of said magneto-electric converting means and for continuing the interruption even when the output of said delay circuit falls below said predetermined level, thereby turning OFF said converting means and interrupting the current flowing through said driving coils, said switching means being connected in series with the operating control current path for said magneto-electric converting means.

2. An overcurrent protection circuit as defined in claim 1 wherein said magneto-electric converting means comprises Hall element means for controlling the current supplied to said driving coils, switching circuit means is connected in series with the operating control current path for said.

3. An overcurrent protection circuit as defined in claim 2 wherein said switching circuit comprises a normally OFF first transistor having a control electrode connected to the output of said delay circuit means, a normally ON second transistor connected in series with said operating control current path and having a control electrode connected to the output of said first transistor, a positive feedback circuit connected between the output of said second transistor and the control electrode of said first transistor, whereby the occurrence of said output of said predetermined level places said switching circuit in a latched state where said first transistor is ON and said second transistor is OFF, and said feedback circuit maintains said latched state even when said output falls below said predetermined level.

* * * * *